United States Patent
Hanley

(10) Patent No.: US 7,590,998 B2
(45) Date of Patent: Sep. 15, 2009

(54) TELEVISION SYSTEM HAVING INTERNET WEB BROWSING CAPABILITY

(75) Inventor: Mark G. Hanley, Skamania, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 321 days.

(21) Appl. No.: 11/494,196

(22) Filed: Jul. 27, 2006

(65) Prior Publication Data

US 2008/0046945 A1    Feb. 21, 2008

(51) Int. Cl.
*H04N 7/173* (2006.01)

(52) U.S. Cl. .................. 725/112; 725/109; 725/110; 725/113

(58) Field of Classification Search ............ 725/112
See application file for complete search history.

(56) References Cited

U.S. PATENT DOCUMENTS

| | | | |
|---|---|---|---|
| 5,404,393 | A | 4/1995 | Remillard |
| 5,929,849 | A * | 7/1999 | Kikinis ............. 725/113 |
| 6,049,812 | A * | 4/2000 | Bertram et al. ......... 715/205 |
| 6,151,077 | A | 11/2000 | Vogel et al. |
| 6,615,408 | B1 * | 9/2003 | Kaiser et al. .......... 725/112 |
| 2001/0001160 | A1 * | 5/2001 | Shoff et al. ............ 725/51 |
| 2002/0056109 | A1 * | 5/2002 | Tomsen ............... 725/60 |
| 2002/0059610 | A1 | 5/2002 | Ellis |
| 2002/0104095 | A1 | 8/2002 | Nguyen et al. |
| 2003/0033605 | A1 | 2/2003 | Bartfeld |
| 2003/0048381 | A1 | 3/2003 | Glatt |
| 2003/0182663 | A1 | 9/2003 | Gudorf et al. |
| 2003/0204854 | A1 * | 10/2003 | Blackketter et al. ...... 725/113 |
| 2004/0010808 | A1 | 1/2004 | deCarmo |
| 2004/0231003 | A1 | 11/2004 | Cooper et al. |
| 2005/0015809 | A1 | 1/2005 | Boys |
| 2005/0066362 | A1 | 3/2005 | Rambo |
| 2005/0066363 | A1 | 3/2005 | Rambo |
| 2005/0066364 | A1 | 3/2005 | Rambo |
| 2005/0091694 | A1 | 4/2005 | Rambo |
| 2005/0108767 | A1 | 5/2005 | Ma |
| 2005/0146642 | A1 | 7/2005 | Fairhurst et al. |
| 2005/0160451 | A1 | 7/2005 | Batra et al. |
| 2006/0195877 | A1 * | 8/2006 | Bentz ................. 725/110 |

FOREIGN PATENT DOCUMENTS

| | | |
|---|---|---|
| CN | 1178430 | 4/1998 |
| CN | 1336065 | 2/2002 |
| CN | 1393785 | 1/2003 |
| CN | 1413009 | 4/2003 |

(Continued)

*Primary Examiner*—Christopher Kelley
*Assistant Examiner*—Farzana Hossain
(74) *Attorney, Agent, or Firm*—Chernoff, Vilhauer, McClung & Stenzel

(57) ABSTRACT

A television system for providing standard television programming and Internet browsing includes a television set for viewing digital and/or analog programming and includes a memory storage device and an integral embedded web browser for displaying data received from an Internet portal. The data is in the form of URLs and web pages that are synchronized with selected TV programming and/or advertising. A remote control selectively displays URLs and/or their associated web pages stored in memory by the Internet portal. In one aspect of the invention, TV programming can be displayed simultaneously on the screen with related web pages and URLs.

7 Claims, 7 Drawing Sheets

FOREIGN PATENT DOCUMENTS

| | | |
|---|---|---|
| EA | 5642 | 4/2005 |
| EP | 1 142 274 | 10/2001 |
| GB | 2 377 336 | 1/2003 |
| GB | 2 395 868 | 6/2004 |
| JP | 11-308544 | 11/1999 |
| JP | 2002-290630 | 10/2002 |
| JP | 2002-369165 | 12/2002 |
| JP | 2003-189282 | 7/2003 |
| JP | 2004-153375 | 5/2004 |
| WO | WO 99/52036 | 10/1999 |
| WO | WO 00/60849 | 10/2000 |
| WO | WO 01/039501 | 5/2001 |
| WO | WO 01/91458 | 11/2001 |
| WO | WO 02/067583 | 8/2002 |
| WO | WO 02/087240 | 10/2002 |
| WO | WO 03/047257 | 6/2003 |
| WO | WO 2004/004173 | 1/2004 |
| WO | WO 2004/006519 | 1/2004 |
| WO | WO 2005/074245 | 8/2005 |

\* cited by examiner

FIG. 2

| SOURCE | Map | | | | | | | | | |
|---|---|---|---|---|---|---|---|---|---|---|
| | 1 | 2 | 3 | 4 | 5 | 6 | 7 | 8 | ... | |
| Digital Cable | Menu | News | PAX | ABC | NBC | KONG | CBS | DSCP | ... | 999 Music |
| Analog Cable | 2 ABC | 3 WB | 4 TVG | 5 KPX | 6 CBS | 7 DSCP | 8 NBC | | | 77 Encore |
| Digital Broadcast | 2 ABC | 6 CBS | 8 NBC | 10 PBS | 12 FOX | 13 PBS | ... | 49 UPN | | |
| Analog Broadcast | 2 ABC | 6 CBS | 8 NBC | 10 PBS | 12 FOX | 13 PBS | ... | 49 UPN | | |

FIG. 3

| SOURCE | Map | | | | | | | | | |
|---|---|---|---|---|---|---|---|---|---|---|
| | 1 | 2 | 3 | 4 | 5 | 6 | 7 | 8 | ... | |
| Digital Cable | cox.com | News.com | PAX.com | ABC.com | NBC.com | KONG.com | CBS.com | DSCP.com | ... | 999 Music |
| Analog Cable | 2 ABC.com | 3 WB.com | 4 TVG.com | 5 KPX.com | 6 CBS.com | 7 DSCP.com | 8 NBC.com | | | 77 Encore.com |
| Digital Broadcast | 2 ABC.com | 6 CBS.com | 8 NBC.com | 10 PBS.org | 12 FOX.com | 13 PBS.org | ... | 49 UPN.com | | |
| Analog Broadcast | 2 ABC.com | 6 CBS.com | 8 NBC.com | 10 PBS.org | 12 FOX.com | 13 PBS.org | ... | 49 UPN.com | | |

TELEVISION SYSTEM HAVING INTERNET WEB BROWSING CAPABILITY

CROSS-REFERENCE TO RELATED APPLICATIONS

Not applicable.

BACKGROUND OF THE INVENTION

Televisions typically display only TV programming. In the past, it has been proposed to turn TV's into devices for web browsing. Examples are shown in the following US Patents and/or Applications: 20010039658; U.S. Pat. Nos. 6,745,223; 6,631,523; 20010018771; U.S. Pat. No. 6,886,178. With a typical television system, unlike in a computer environment, a user typically does not have a keyboard. Computer-based Internet web browsers rely on the keyboard to enter random URLs. Normally, lacking this convenience, a television browser would have to rely on alternate methods of browser control or subject the user to a tedious process of mapping the numeric keyboard of a standard TV remote control to the alphabet; this is assuming that the television system has an Internet connection. This method of entry is common and is most often used in basic cell phone text entry which is time consuming and inconvenient.

In the past, Internet browsing has been provided over conventional television sets. This is known as "Web TV." A keyboard is provided with "Web TV" but this function of the television set exists independently of TV programming. The TV may either be a web browser or a TV receiver but not both.

Advertisers who sponsor programming realize that viewers might like to gain immediate access to web sites featuring products displayed on advertising. Also, TV programmers realize that viewers might wish to access web sites related to the television program currently being offered. At present, the only way this can be done is with a separate computer system. Furthermore, the web pages of interest may be searched or determined by using a search engine if such web pages are not prominently displayed in TV programming and/or advertising, and even then, the URLs for such web pages may be entered via a keyboard on a conventional PC.

BRIEF SUMMARY OF THE INVENTION

A television system for providing standard television programming and Internet browsing includes a television set for viewing digital and/or analog programming and includes a memory storage device and an integral embedded web browser for displaying data received from an Internet portal. The data is in the form of URLs and web pages that are synchronized with selected TV programming and/or advertising. A remote control selectively displays URLs and/or their associated web pages stored in memory by the Internet portal. In one aspect of the invention, TV programming can be displayed simultaneously on the screen with related web pages and URLs.

The foregoing and other objectives, features, and advantages of the invention will be more readily understood upon consideration of the following detailed description of the invention taken in conjunction with the accompanying drawings.

BRIEF DESCRIPTION OF THE SEVERAL VIEWS OF THE DRAWINGS

FIG. 2 is a television display of a TV channel map.

FIG. 3 is a television display of a map of URLs related to the television stations of FIG. 2.

DETAILED DESCRIPTION OF PREFERRED EMBODIMENT

Figure 1A:
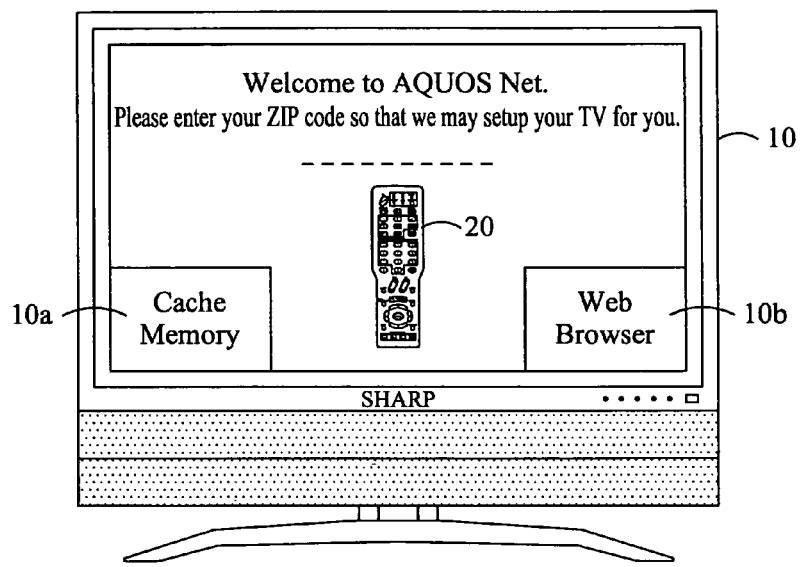
FIG. 1A is a representation of a television set showing a set-up screen.

A system for providing Internet data to a TV viewer includes a TV set for viewing digital and/or analog programming, which includes a memory storage device and a web browser for displaying data received from an Internet service provider. This data may be in the form of URLs and/or web pages that are preferably synchronized with selected TV programs. A remote control permits the TV viewer to selectively display the web data comprising the URLs and/or web pages simultaneously with the receipt of the selected TV programs by the television set.

The URL and/or web pages may be displayed simultaneously with the selected TV programs in various ways. Picture-in-picture or a split-screen format may be employed if desired. The Internet web data may be related to sponsors advertising on selected TV programming or the data may be related to the programming itself. For example, products advertised at various intervals during the TV programming have associated web sites, which may be downloaded into a memory storage device in the television set coupled to an embedded web browser. The Internet data can be periodically loaded into the memory device in synchronization with the timing of advertising and/or program-related information displayed in conjunction with a selected TV program.

Advertising promos occur at defined time slots within a TV program, generally every seven to ten minutes. Thus, the related Internet data for selected advertisers may change synchronously with the commercial intermissions during the programming. Thus in one aspect of the invention, the memory device associated with the web browser in the television set is periodically refreshed with URL's related to the advertising promos being shown every time there is a commercial break. However, users interested in a particular product or promotion may wish to prevent the periodic refresh of the memory device to enable them to view web pages associated with a particular product. Thus, the embedded web browser, under command of the remote control, may include a lockout function that prevents the memory cache from being refreshed until the television viewer releases the lockout. In this way, the user can browse the web pages of interest regardless of the change in URL's provided by the internet portal.

The system contemplates a television set for receiving TV programs including an embedded web browser and memory cache. There may also be an Internet data portal, which is coupled to the TV set, and through this portal, Internet data is provided which is mapped to at least selected TV programs and synchronously loaded into the memory cache during the broadcast of those selected TV programs. The Internet data provider works in conjunction with TV programmers and advertisers so that selected URLs are properly mapped to the TV programming/advertising. Thus, the Internet data provider operates between the TV set and a general connection to the World Wide Web. The Internet data provider could be, for example, the TV set manufacturer who maintains a server dedicated to provide customers with URLs that are mapped to the TV programming and advertising synchronously with the broadcast or transmission of the selected TV programs. In a manner similar to the way in which Internet search engines charge for advertising, the Internet data provider could charge the advertisers and TV-program producers for "hits," i.e., the selection by the TV viewer of selected URLs for display of the associated web pages on the television set.

Figure 1:
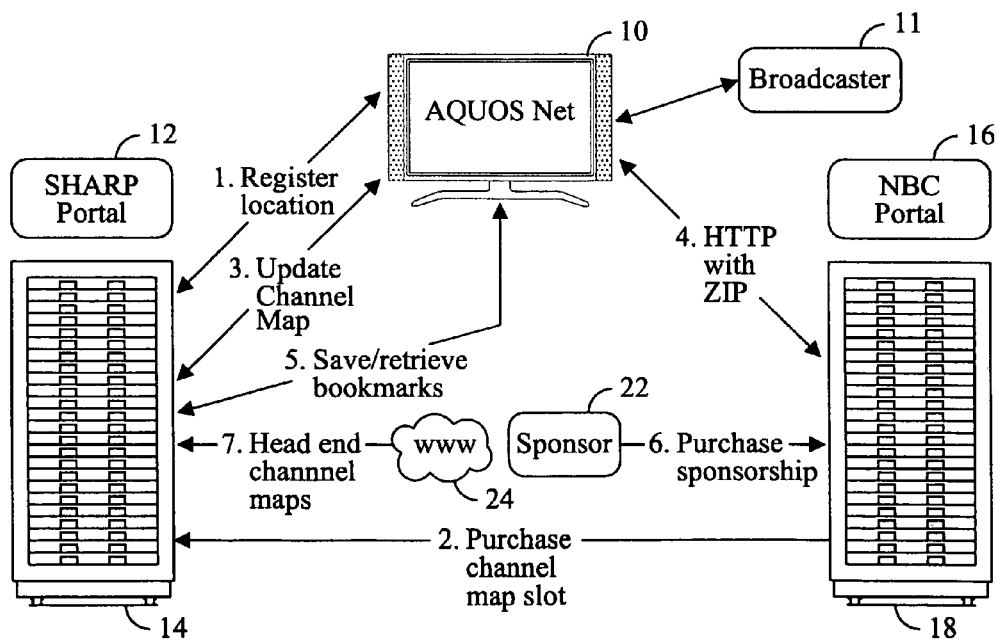
FIG. 1 is a schematic drawing of a system for providing both Internet web browsing and TV programming to a standard television set.

Referring to FIG. 1, a television set 10 sends a code as illustrated by the arrow 1 to an Internet portal 12. The Internet portal 12 includes a server 14 and may be associated with the manufacturer of the television set.

A broadcaster 11, which may be a cable company or a service such as DISH Network, broadcasts signals that are received by the television set 10. The broadcaster is linked to a number of portals for television programming, such as the NBC portal 16. It is to be understood that each program provider who provides programming to the broadcaster 11 has a similar portal. Broadcasters, such as cable companies or DISH Network companies, may have hundreds of such portals. Each portal would have an associated server 18, which contains Internet data related both to programming and provided by the portal and advertising provided by the program's sponsors.

Referring to FIG. 1A, the television 10 includes an embedded web browser 10b and cache memory 10a. A remote control 20 includes functionality for launching the web browser 10b and for selecting URLs that are stored in the cache memory 10a so that associated web pages may be displayed on the television 10.

In addition to standard TV functionality (viewing video content from Broadcaster 11), TV 10 has an HTML browser and access to the internet. Each TV channel is mapped to a URL provided by server 14. This mapping resides on the TV 10 and feeds the browser with an appropriate URL as TV channels are changed, relieving the user from having to enter typically long URLs by hand via the TV remote control unit. In this way, HTML content is retrieved from third party servers via HTTP request 4. This mapping synchronizes the video broadcast stream from Broadcaster 11 to a parallel content stream (HTML) from the internet. In this scenario, Sharp controls the contents of the URL map residing in TV 10 via the Update Channel Map action 3. Sharp knows which channels TV 10 has available to it by using TV location registration 1 to filter all head end channel maps 7 that are available via the internet 24. Portals such as NBC 16 would purchase channel map slots from Sharp 12 and then proceed to solicit sponsorship 6 in the form of URLs from Sponsors 22. Sharp thereby rents space in the URL map on TV 10 to Portals 16 while Portal 16 rents space in the page served from the slot it purchased 2 to Sponsor 22.

Through the use of the remote control 20, bookmarks may be either saved or retrieved by the television set 10 by accessing the television portal's server 14 as indicated by arrow 5. The server 14 maps the advertising and program information from the server 18 and from the World Wide Web 24 to each associated television channel and periodically updates the channel map and the associated programming/advertising Internet data as indicated by the arrow 3.

Referring to FIG. 2, the television is capable of displaying a typical TV channel map. The remote control allows a TV viewer to select any one of a number of channels displayed in the map. As shown in FIG. 3, another view is possible on the television set 10. The remote control can select to view a map of the available channels, but this time display their associated URLs.

Figure 4:
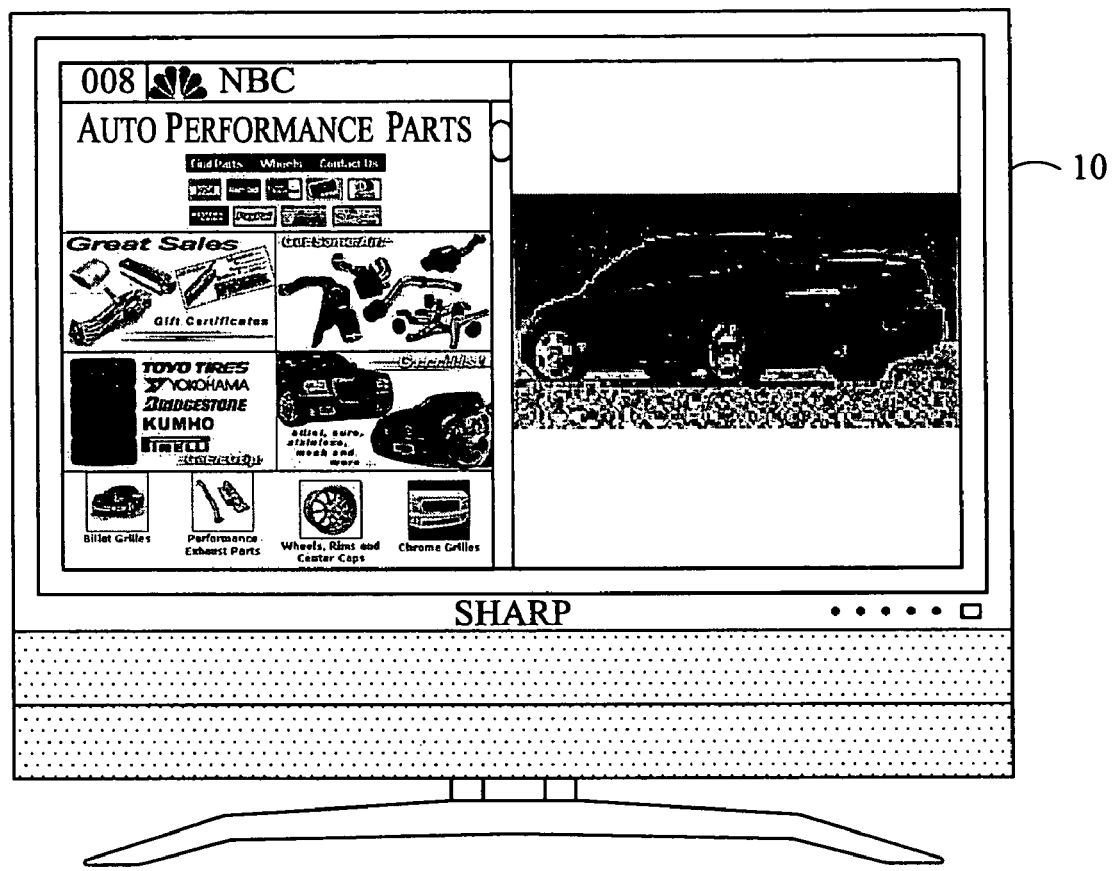
FIG. 4 is a representation of a television screen showing simultaneous television programming and Internet data in a split-screen format.

Referring to FIG. 4, the television set 10 may include a split-screen displaying, for example, an advertisement on the right side and on the other side displaying icons, which represent web pages related to the advertising commercial shown on the right side of the screen. Thus, a car advertisement also shows related web pages, which include tires, mufflers, auto dealerships and a performance magazine as examples. The viewer may choose then to display any of these web pages and related Internet data by manipulating a cursor of the like and selecting the page by way of the remote control 20.

Figure 5:
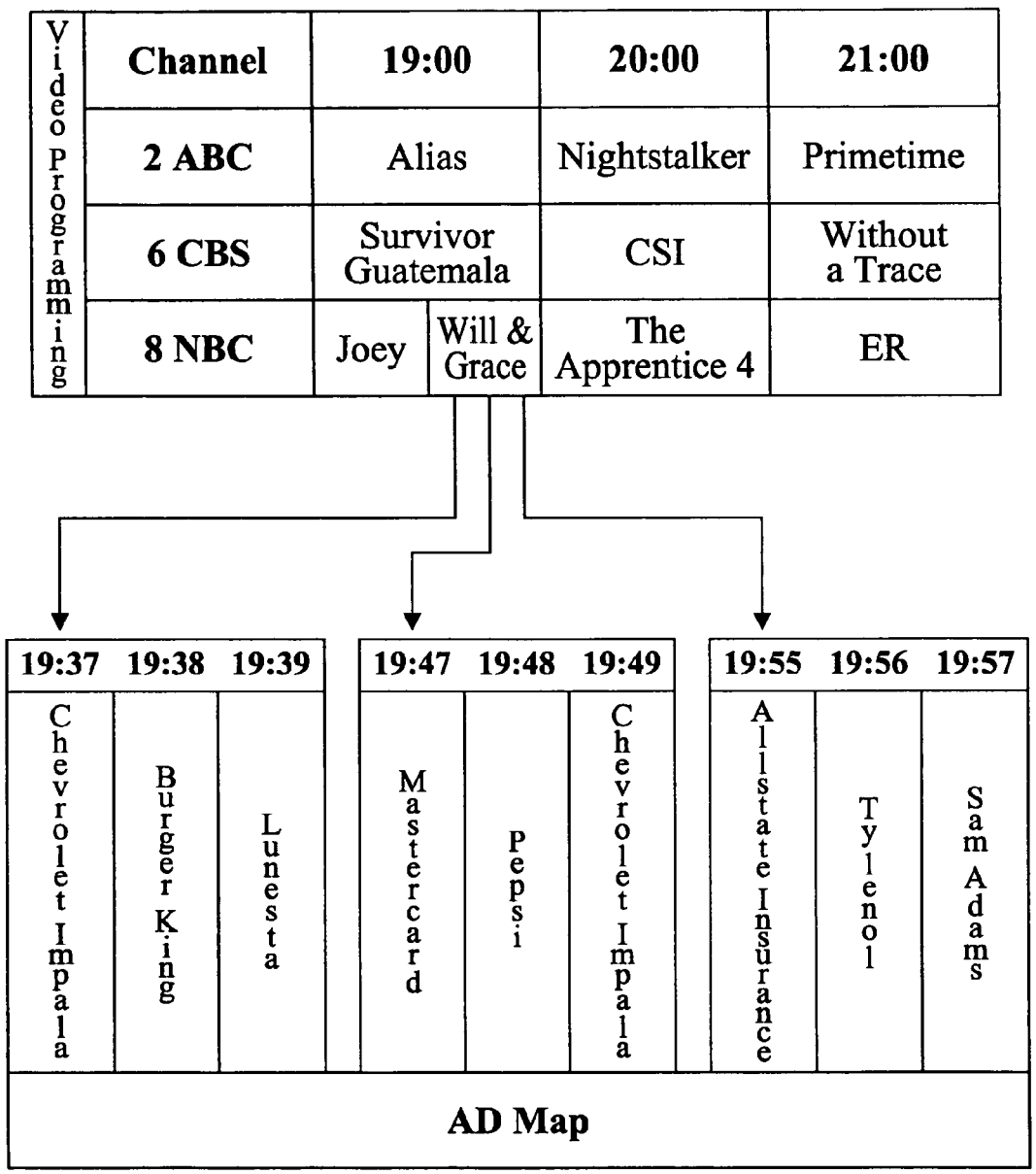
FIG. 5 is a schematic diagram illustrating how sponsors' web sites are linked to TV programming at predetermined time intervals during the program.

FIG. 5 shows schematically an advertising map related to a selected TV program. In this case, a particular program ("Will and Grace") has inserted advertisements at predetermined time slots during the program. The map shows the relationship between the time slots and the times when advertising runs. In each case, URLs related to each advertisement may appear on the screen in the manner illustrated in FIG. 4. The "Chevrolet Impala" ad, which runs at 19:37 in "Will and Grace", is what is illustrated in FIG. 4 and any associated URLs may be displayed along with the advertising in, for example, a split-screen format.

Figure 6:
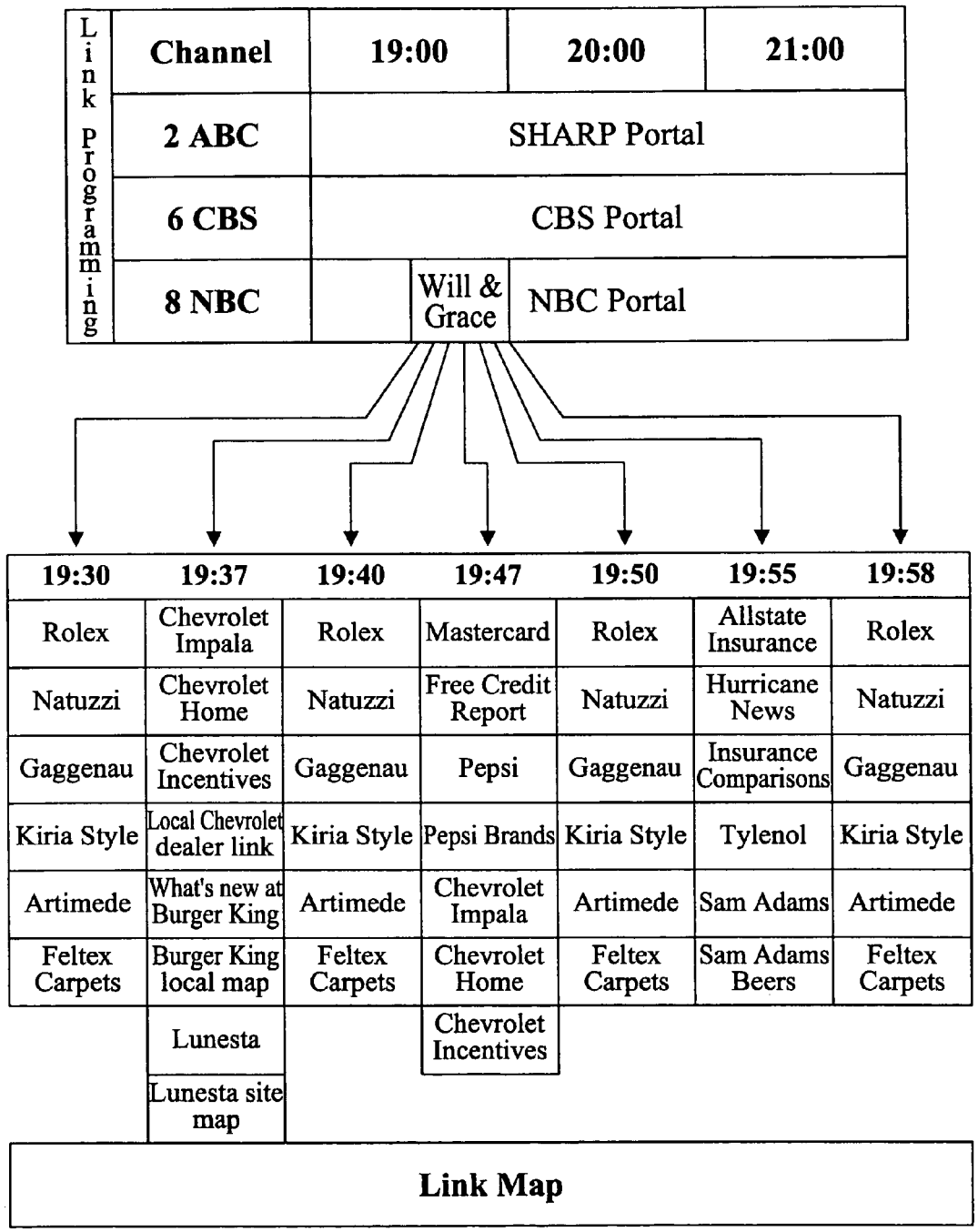
FIG. 6 is a second illustration showing the TV program-website linking of FIG. 5.

Referring to FIG. 6, a more elaborate URL map is shown that is linked to a specific program. In this case, the map displays all of the URLs which may be associated with a particular advertisement being run at a particular time slot.

Because the URLs available during a predetermined time slot are temporarily stored in the cache memory 10a of the television set 10, a feature may be provided that would enable the viewer to lock a particular URL or set of URLs into the memory and prevent it from being refreshed. This would be the case if the viewer wished to explore these links on the Internet while the program was proceeding. With the television 10 operating in the mode shown in FIG. 5, a transitional state occurs whenever a time boundary is crossed, for example, at 19:37 as shown in FIG. 6. Thus, the page showcasing Rolex and associated product URLs is scheduled to be replaced with a page showcasing Chevrolet and other advertising content indicated under the column labeled "19:37". Advertisers naturally would prefer to see their content run as scheduled and so an automatic update of the page is preferably reloaded in the browser with fresh content. The TV viewer, however, may wish to browse the Internet and would not welcome such interruption. Thus, a lock button on the TV remote control may be provided which toggles between locked and open browser states. This state may be indicated to the viewer in the browser window. Each http request would then relay this state to the application server. The function may be accomplished by sending HTML Java script that prevents the reloading of fresh Internet data into the cache memory 10a. When the lock function is released, the memory may be refreshed at the next applicable time slot in the selected program.

Figure 7:
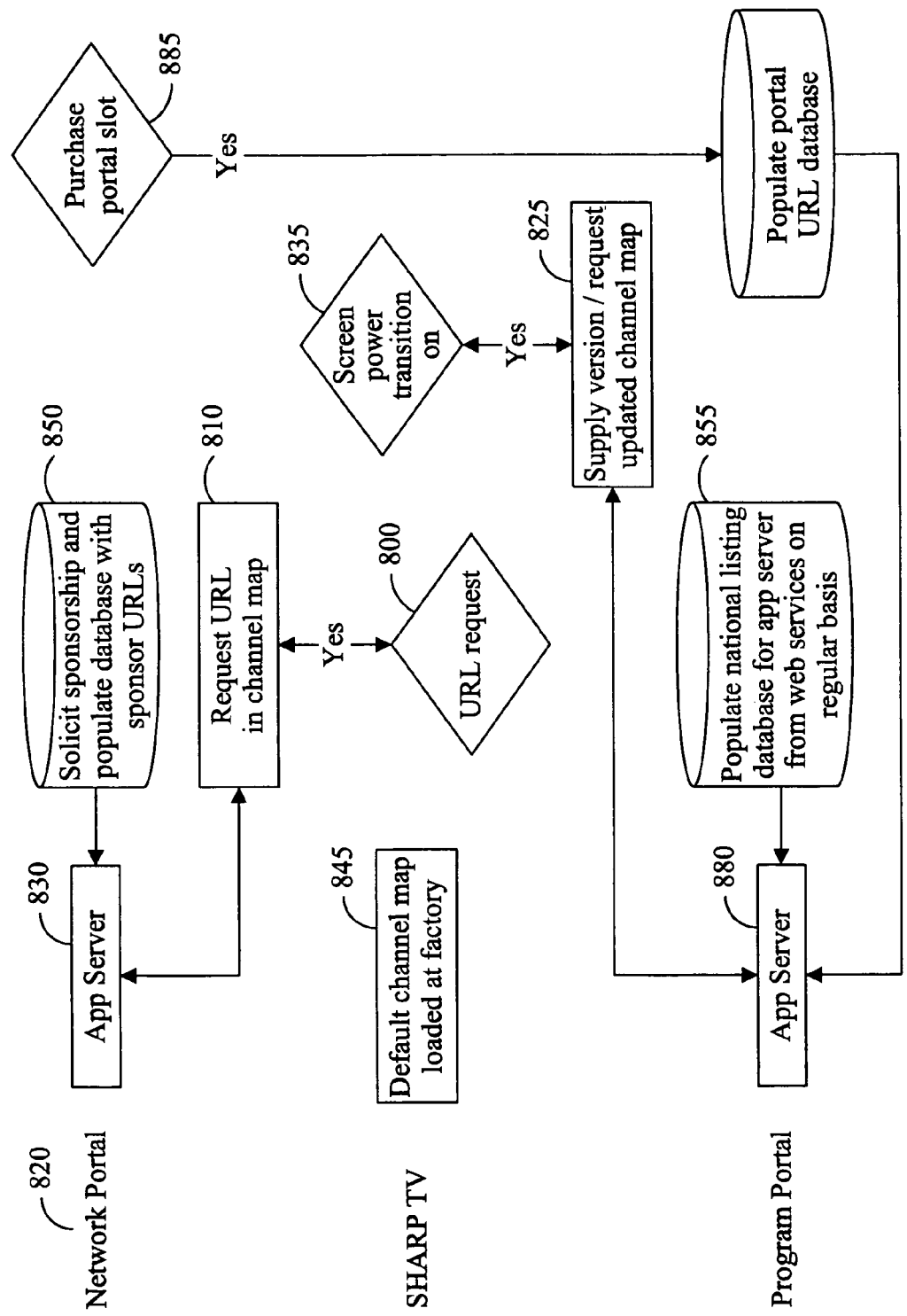
FIG. 7 illustrates a system flowchart.
Figure 8:
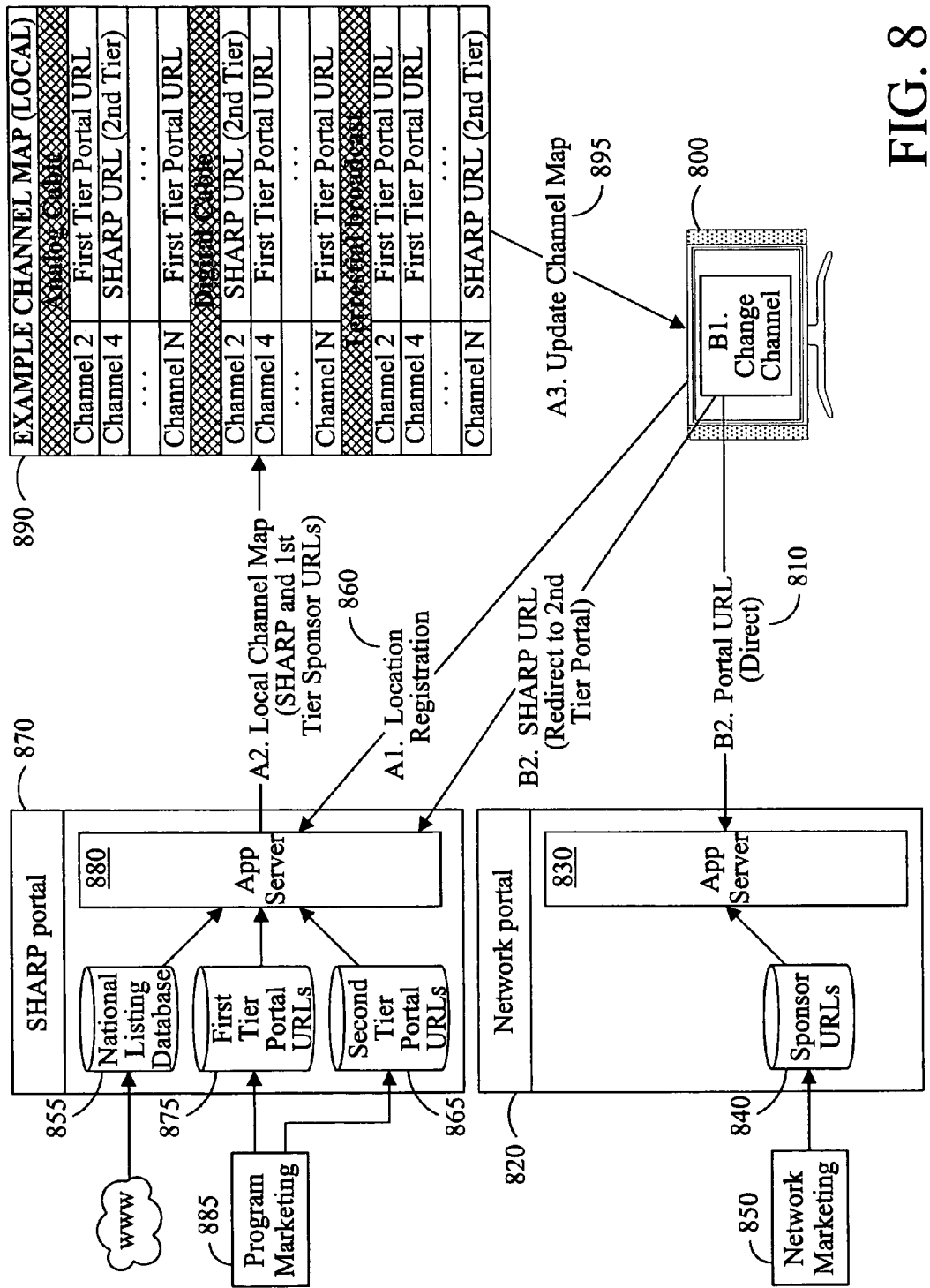
FIG. 8 illustrates portals for a channel map together with a television.

Referring to FIG. 7, the system may include the ability to access general URLs (e.g., network locations) and specific URLs related to the program content. In either case, the television device is directed to a defined server(s) to obtain the information. For example, the user of a television device may do a general search for "Java Virtual Machines", which would be directed to a server that carries out the request on behalf of the user. Referring also to FIG. 8, the television 800 directs a general search query 810 to a network portal 820. The network portal 820 includes an application server 830 that provides the search results to the television 800. The search results may contain general search results, such as those available from www.google.com. In addition to the general search results the application server 830 may provide sponsored URLs from a sponsored URL database 840 that are displayed to the user together with the general search results. A networking marketing service 850 may be used to obtain business entities for the sponsored URL database 840, billing for providing URLs to the user, and/or billing for the user selecting the URLs.

The television 800 may include a channel map 890, as previously described. The television 800 may receive updated channel maps 895. The channel map 890 is preferably not updated to the television 800 more often than necessary. Accordingly, portions of the channel map 890 may be updated on a relatively regular basis ("Sharp" (e.g., manufacturer) and $1^{st}$ tier sponsors). Other portions of the channel map 890 may be updated on a far less regular basis, or not updated at all. In the event that the channel is not updated, or otherwise not current, an application server 880 on a program portal 870, described below, may provide the appropriate URLs to a request from the television 800.

The television 800 may also, for URLs related to particular channels as previously described, direct a query 860 to the program portal 870. The program portal 870 may include the application server 880 that provides the search results to the television 800. The search results may contain the program specific search results, as previously described.

A program marketing 885 may be used for entities to purchase a slot in the channel map 890. The results of the program marketing 885 may be used to populate a $1^{st}$ tier 875 and a $2^{nd}$ tier 865 portal result. The $1^{st}$ tier 875 database are regularly updated within the program channel 890. The $2^{nd}$ tier 865 database are irregularly updated, updated together with any $1^{st}$ tier updates, or not updated within the program channel 890. The $2^{nd}$ tier 865 database may be provided indirectly from the application server 880 when a search is performed. A national listing database 855 may likewise be included in the program portal 870. Depending on the system configuration, the $1^{st}$ tier portal URLs 875 may be provided directly through the channel map 890 so that the television 800 goes directly to the appropriate network location for information, while the $2^{nd}$ tier portal URLs 865 are provided by the program portal 870 or by redirection by the program portal 870.

The television 800 may have a default channel map 845. In addition, when the television 800 is turned on the television may request 825 an updated channel map 890.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

I claim:

1. A TV system for viewing TV programming and for displaying Internet data comprising:

(a) a TV monitor for displaying TV programs and Internet data;
    (b) a TV tuner coupled to said monitor for receiving analog and/or digital TV programming;
    (c) a web browser coupled to said TV monitor including a memory storage device for receiving sequential groups of Internet data, wherein receipt of a sequentially next group of said Internet data into said memory storage is synchronized to a pre-defined time slot within at least one of said TV programs so as to be loaded into said memory storage device at pre-selected time intervals; and
    (d) a remote control device for selectively displaying said TV programs, said Internet data or both on said TV monitor, where said remote control permits a user to suspend receipt of a next sequential group of Internet data into said memory storage at the said time slot to which it is synchronized, and while said TV monitor displays to a user a said group of Internet data sequentially prior to said next sequential group.

2. The TV system of claim 1 further including an internet data portal for mapping selected Internet data in the form of URLs to selected TV programs at predetermined times and for transmitting said data to said web browser and memory storage device.

3. The TV system of claim 2 wherein said remote control provides user data to an Internet data portal upon selection of a URL displayed on said TV monitor.

4. A TV system for providing Internet data to a TV viewer in conjunction with the viewing of TV programming comprising:

(a) a TV set for receiving TV programs from a TV programming portal, said TV set including an embedded web browser and memory cache;
    (b) an Internet data portal coupled to said TV set, said Internet data portal providing Internet content mapped to at least one of said TV programs and synchronously loaded into said memory cache during the broadcast of a predetermined one of said TV programs; and
    (c) a control device for selectively displaying a broadcast TV program, Internet data mapped to said TV program, or both, wherein said control device includes a function for selectively stopping the loading of said Internet content into said memory cache during a time interval in which previously-loaded said Internet data is displayed to said viewer.

5. The TV system of claim 4 wherein said Internet data includes URLs related to advertising content associated with said TV programs.

6. The TV system of claim 5 wherein URLs are loaded into said memory cache by said Internet data portal during the broadcast of said advertising content.

7. The TV system of claim 6 wherein said URLs are loaded into said memory cache at predetermined times and for preselected time intervals corresponding to the display of related advertising.

* * * * *